US 7,978,253 B2

(12) United States Patent
Watanabe

(10) Patent No.: US 7,978,253 B2
(45) Date of Patent: Jul. 12, 2011

(54) IMAGE PICKUP DEVICE USING BLUR PROCESSING AND CONTROL METHOD THEREOF

(75) Inventor: Yoshikazu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 363 days.

(21) Appl. No.: 12/167,844

(22) Filed: Jul. 3, 2008

(65) Prior Publication Data

US 2009/0021600 A1      Jan. 22, 2009

(30) Foreign Application Priority Data

Jul. 18, 2007   (JP) .................................. 2007-186553

(51) Int. Cl.
  *G03B 13/00* (2006.01)
(52) U.S. Cl. .......................... 348/345; 348/239; 348/348
(58) Field of Classification Search .................. 348/345, 348/245, 239
  See application file for complete search history.

(56) References Cited

U.S. PATENT DOCUMENTS

| | | | |
|---|---|---|---|
| 6,201,517 B1 * | 3/2001 | Sato .................................. | 345/7 |
| 6,900,841 B1 | 5/2005 | Mihara | |
| 7,027,171 B1 | 4/2006 | Watanabe | |
| 7,324,139 B2 | 1/2008 | Watanabe | |
| 7,657,171 B2 * | 2/2010 | Sundstrom ..................... | 396/133 |
| 2001/0036319 A1 * | 11/2001 | Sakaida et al. ................. | 382/232 |
| 2003/0117511 A1 * | 6/2003 | Belz et al. ................. | 348/333.11 |
| 2006/0059201 A1 | 3/2006 | Watanabe | |
| 2007/0071432 A1 * | 3/2007 | Senba .......................... | 396/121 |
| 2009/0096897 A1 * | 4/2009 | Saito ............................. | 348/241 |
| 2010/0208944 A1 * | 8/2010 | Fukunishi ..................... | 382/107 |

FOREIGN PATENT DOCUMENTS

| | | | |
|---|---|---|---|
| EP | 1 953 679 A2 | | 8/2008 |
| JP | 04328706 A | * | 11/1992 |
| JP | 09181966 A | * | 7/1997 |
| JP | HEI9-318870 | | 12/1997 |
| JP | 2000-152065 | | 5/2000 |
| JP | 2000-207549 | | 7/2000 |
| JP | 2000-259823 | | 9/2000 |
| JP | 2000-350077 | | 12/2000 |
| JP | 2000-354181 | | 12/2000 |
| JP | 2003-107335 | | 4/2003 |
| JP | 2003-250120 | | 9/2003 |
| JP | 2004-032553 | | 1/2004 |
| JP | 2004-040204 | | 2/2004 |
| JP | 2004-104534 | | 4/2004 |
| JP | 2004-112549 | | 4/2004 |
| JP | 2004-112550 | | 4/2004 |
| JP | 2004-260768 | | 9/2004 |

(Continued)

*Primary Examiner* — Jason Chan
*Assistant Examiner* — Cynthia Calderon
(74) *Attorney, Agent, or Firm* — Dickstein Shapiro LLP

(57) ABSTRACT

An image pickup device includes a system control section which determines an area with closest proximity as an AF area among AF evaluation areas in a central part of an image. In addition, a block with the same distance as the AF area is determined as a main subject block. Then the system control section calculates and memorizes an average brightness of an image data of a position corresponding to a main subject block. Then, the system control section determines a main subject area based on obtained information on the main subject block and a photographed image. Furthermore, based on information on a main subject area, an extraction processing of the main subject image, a blur processing of a background image and a composite processing are sequentially performed.

16 Claims, 7 Drawing Sheets

FOREIGN PATENT DOCUMENTS

| | | |
|---|---|---|
| JP | 2004-336170 | 11/2004 |
| JP | 2005-073119 | 3/2005 |
| JP | 2005-175956 | 6/2005 |
| JP | 2005-175959 | 6/2005 |
| JP | 2005-184469 | 7/2005 |
| JP | 2006-013776 | 1/2006 |
| JP | 2006-013782 | 1/2006 |
| JP | 2006-254333 | 9/2006 |
| JP | 2006-295573 | 10/2006 |
| JP | 2006-333299 | 12/2006 |
| JP | 2007-019961 | 1/2007 |
| JP | 3940555 | 4/2007 |
| JP | 2007-134910 | 5/2007 |
| JP | 3954879 | 5/2007 |
| JP | 2007-186553 | 7/2007 |
| JP | 4028246 | 10/2007 |
| JP | 2007-304774 | 11/2007 |
| JP | 2008-065641 | 3/2008 |
| JP | 2008-078738 | 4/2008 |
| JP | 2008-193387 | 8/2008 |
| JP | 2009-54130 A | 3/2009 |
| JP | 2009-55125 A | 3/2009 |
| WO | WO 2007049634 A1 * | 5/2007 |

* cited by examiner

IMAGE PICKUP DEVICE USING BLUR PROCESSING AND CONTROL METHOD THEREOF

CROSS-REFERENCE TO THE RELATED APPLICATION

This application is based on and claims the priority benefit of Japanese Patent Application No. 2007-186553, filed on Jul. 18, 2007, the disclosure of which is incorporated herein by reference in its entirety.

BACKGROUND OF THE INVENTION

1. Field of the Invention

The present invention relates to an image pickup device such as a digital still camera provided with a blur processing function and a method for controlling the image pickup device.

2. Description of the Related Art

An image pickup element used in a compact digital camera is smaller both than an image pickup element used in a single-lens reflex camera and a silver-salt film. Therefore, in order to photograph an image with the same view angle, the focal length of a photographic optical system is required to be shorter. Even if the F-number of the photographic optical system is set the same, when the focal length is small, the depth of field becomes greater. Although the depth of field may become shallow when the F-number can be reduced in proportion to a shortening of the focal length, an aperture of the photographic optical system would be required to be large, which incurs an increase in both the size and cost of the photographic optical system. Therefore, comparatively speaking, the in-focus range is wider when photographing with such a compact digital camera. In this respect, it can be considered as an advantage of the compact digital camera when photographing an image with the same brightness. However, it can also be disadvantageous when photographing an image such as a portrait for which the blurring degree of the background is important, because even the background of the image is undesirably clear. In order to solve the above-mentioned problem, cameras to blur the background of the image via image processing have been proposed in Japanese Application Publication Number 2000-207549, Japanese Application Publication Number 2000-259823, Japanese Application Publication Number 2005-175956 and Japanese Application Publication Number Hei9-318870.

It is known that distance information corresponding to respective areas within the image is indispensable in order to properly determine an area whereto blur processing is performed with an appropriate blurring amount. However, in the aforementioned proposals, acquisition of the essential information of distance lacks explicitness in description. More disadvantageously, an adoption of optical systems composed of image pickup elements of two systems has caused the problems of increased size and cost of the optical systems. Furthermore, in the aforementioned proposals, since there is no consideration of determining the proper blurring amount prior to a user's photographing, which amounts to an intended adjustment, an actual minor adjustment, expressed as an addition of a blurring effect, has not been feasible in reality.

SUMMARY OF THE INVENTION

The present invention has been accomplished in view of the hitherto unsolved problems of the prior technology and it is an object of the invention to provide an image pickup device functioning as a camera, which is capable of performing proper blur processing whilst employing CCDAF used in a common compact digital camera instead of using special hardware, and a method for controlling the image pickup device.

In order to achieve the above object, the image pickup device is configured as follows. The image pickup device includes an image pickup element to photograph a subject; an imaging lens to form a subject image on the image pickup element; a moving section to move a lens so as to perform focus adjustment; and a section which determines a focusing degree of each predetermined area within an image, wherein the image pickup device is provided with a lens position determining section which obtains each focusing degree of respective lens moving positions to determine a lens position with a maximum focusing degree; a distance determining section which determines a distance from a lens position to the subject corresponding to the respective predetermined areas within the image; an image area determining section which determines an in-focus image area of the subject; and an image processing section which performs image processing to the image beyond the in-focus image area of the subject based on the distance.

DETAILED DESCRIPTION OF THE PREFERRED EMBODIMENTS

Embodiment 1

Figure 1:
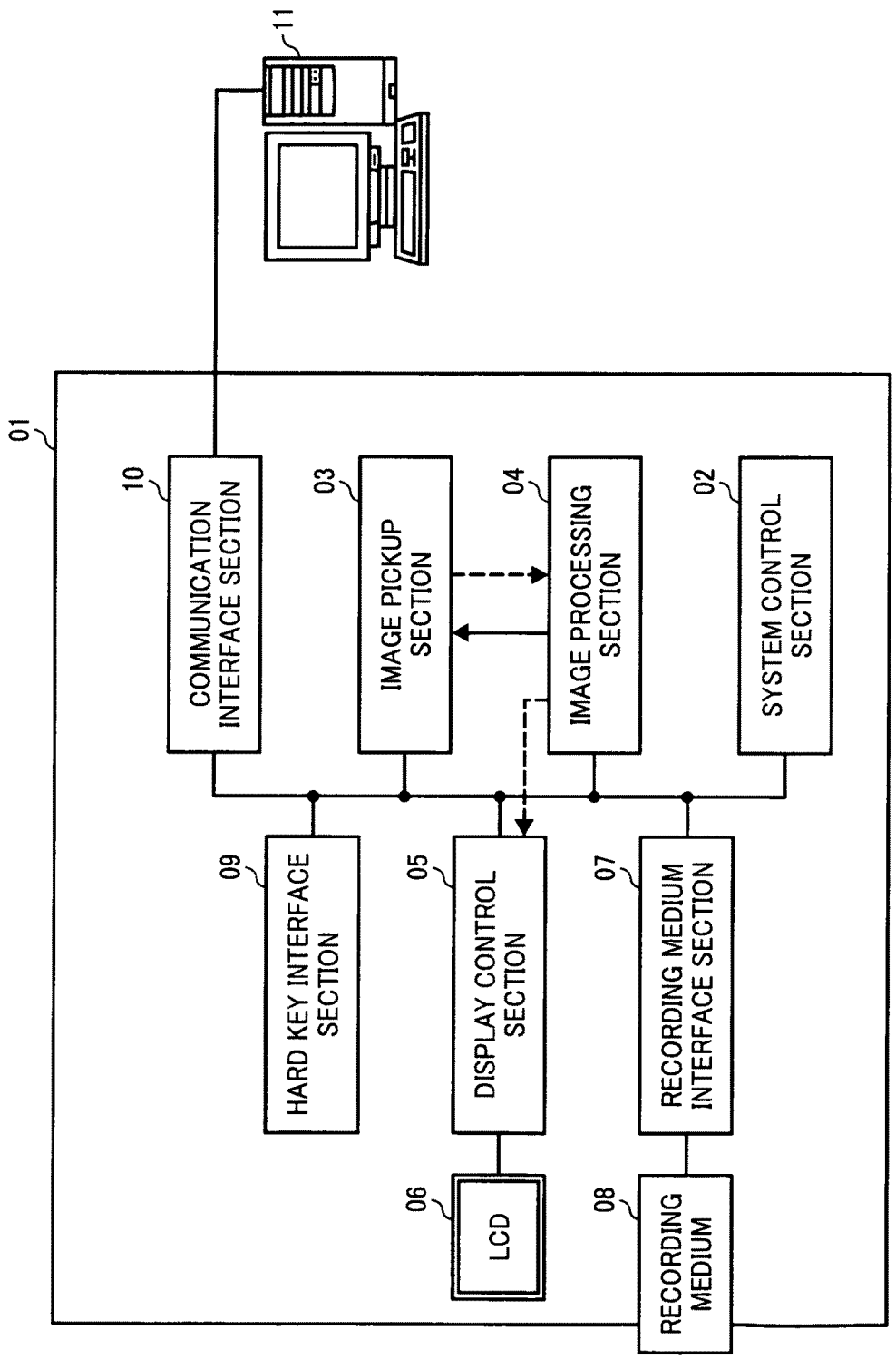
FIG. 1 is a block diagram showing a construction of an image pickup device according to an embodiment of the present invention.

Preferred embodiments of the present invention will be explained in detail hereinafter with reference to the accompanying drawings. FIG. 1 illustrates a schematic structure of a digital still camera and a configuration of connection devices. In FIG. 1, reference numeral 01 denotes the digital still camera; reference numeral 02 represents a system control section composed of a CPU, a NAND flash memory, a SDRAM, a timer, etc., provided to perform control over the entire digital still camera 01; and reference numeral 03 denotes an image pickup section composed of an optical system component (a lens and a lens drive motor), a CCD, a CCD drive circuit, an A/D converter, etc.

Reference numeral 04 represents an image processing section, which is composed of a DSP (a digital signal processor) to process an image, a RAM and etc., provided to perform compressing and expanding of the image. The image processing section performs CCD driving timing of the image pickup section 03, zooming to control a lens drive motor, focusing and an exposure adjustment, etc., accompanied by performing various image processing to images obtained by the image pickup section 03. Reference numeral 05 denotes a display control section to perform signal processing so as to display the processed image signal processed in the image processing section 04 to a LCD. The display control section 05 is composed of a D/A converter, an on-screen display controller, etc., provided to display various graph images generated for a user interface to the LCD.

Reference numeral 06 denotes the LCD to display the image, provided to display the graph images for the user interface. Reference numeral 07 represents a recording medium interface section which is composed of a memory card controller, etc., provided to interface the recording medium. Reference numeral 08 denotes a recording medium which is composed of a flash memory, provided to store various information associated with the compressed image signal and the image. The recording medium 08 is attachable to and detachable from the digital still camera 01.

Reference numeral 09 denotes a hard key interface section which is composed of a sub CPU or the like. The hard key interface section 09 is provided to detect a state of the user interface such as a key (not shown) and a dial (not shown) and to perform main power control to a main CPU. Reference numeral 10 represents a communication interface section composed of a communication controller, which is provided to perform data communication via connecting to a USB. Reference numeral 11 denotes a PC, which is provided to perform various kinds of settings to the digital still camera 01 and to connect the digital still camera 01 via the USB to transfer and display the image from the digital still camera 01.

First, a conventional start operation will be illustrated as follows. When the user presses a power button (not shown), the hard key interface section 09 starts power supply to the main CPU. The main CPU in the system control section 02 first starts an access (an execution of a program) from a boot section of the NAND flash memory and transmits the program/data to the SDRAM via the boot program. When the transmission to the SDRAM is completed, an execution pointer of the program (a program counter) is moved to the transmitted program on the SDRAM, whereafter a start processing is commenced by the program on the SDRAM.

The start processing includes an initialization of an OS (operating system), an extension of a lens barrel and an initialization of the recording medium or the like. The extension of the lens barrel is performed by giving a pulse signal at a predetermined interval (2 ms) to the lens drive motor of the image pickup section 03 via the image processing section 04. With respect to the initialization processing of the recording medium, an initialization command is issued to the recording medium 08 after supplying power and a clock to the recording medium 08 via the recording medium interface section 07. An actual initialization processing of the recording medium is performed within the recording medium 08. In order to detect completion of the actual initialization process of the recording medium 08, the system control section 02 polls a status of the recording medium 08 at an interval of 10 ms.

Then, operation at the time of photography will be illustrated as follows. Prior to the photography, the user determines a photographing mode (a high image quality mode, a low image quality mode, etc.) by operating various keys (not shown) and dials (not shown). The operation contents of the user are determined in the system control section 02 via the hard key interface section 09. The system control section 02 generates a guidance graph to the display control section 05 in response to the operation of the user, whereby promoting the following operation of the user. When the photographing mode is determined, the system control section 02 sets processing parameters to the image processing section 04 corresponding to the photographing mode.

Alternatively, the user determines a view angle (a composition) by operating a zoom lever (not shown). The operation contents of the user are determined in the system control section 02 via the hard key interface section 09. The system control section 02 controls the image pickup section 03 and drives the lens thereof in response to the operation of the user. Under the control from the image processing section 04 and prior to a practical photographing, the image pickup section 03 starts photographing operation so as to display a monitoring image.

Photographed data is conveyed to the image processing section 04 continuously and processings such as a conversion of a color space, a gamma compensation, a white balance adjustment, etc., are performed in the image processing section 04, whereafter an image data is conveyed to the display control section 05. The display control section 05 performs signal processing to the image data and displays a processed data to the LCD 06 so as to present a photographing state to the user. When a release button (not shown) is pressed, similar to the mode settings, operation contents of the user are determined in the system control section 02 via the hard key interface section 09.

Under the control from the image processing section 04, the image pickup section 03 transmits a taken image to the image processing section 04 after performing a focus adjustment. The image processing section 04 performs image processing and compression processing corresponding to the photographing mode. After the compressed image data is read by the system control section 02 and header information is added in addition, a converted data is written to the recording medium 08 via the recording medium interface section 07. A succession of photographing operations are completed as described above.

EXAMPLE 1

Figure 3:
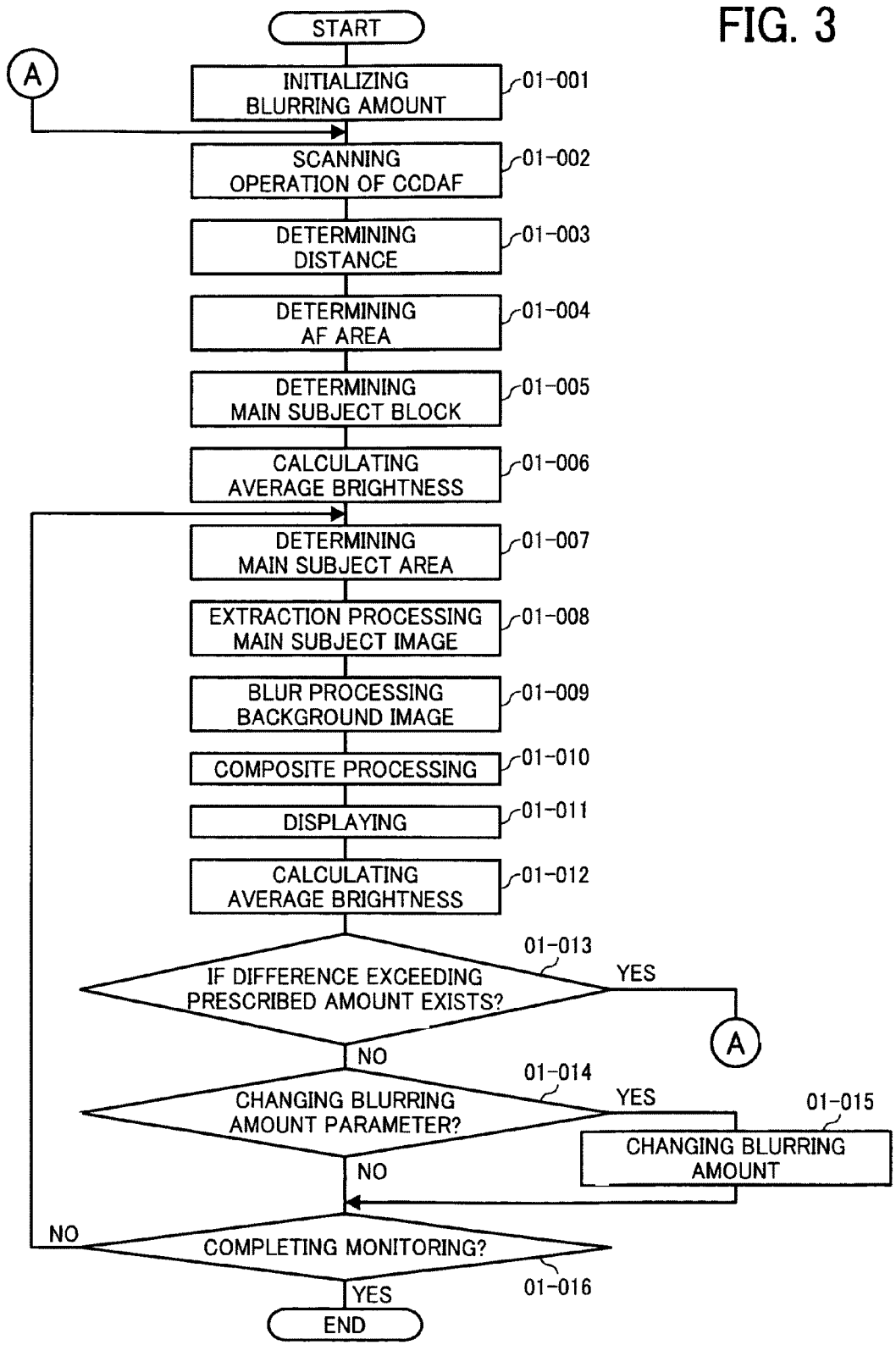
FIG. 3 is an operation flow of the example 1.

Then, a first example of the present invention will be illustrated when distance information is acquired based on variance in brightness. An operational flow is shown in FIG. 3, wherein operations during the monitoring are illustrated. When the monitor operations begin, the system control section 02 sets a blurring amount parameter described hereinafter to an initial value (=5) (step 01-001). The system control section 02 controls the image processing section 04 and the image pickup section 03, and performs a scanning operation of CCDAF (step 01-002). Then the system control section 02 performs distance determination to each position of each image (step 01-003).

Figure 2:
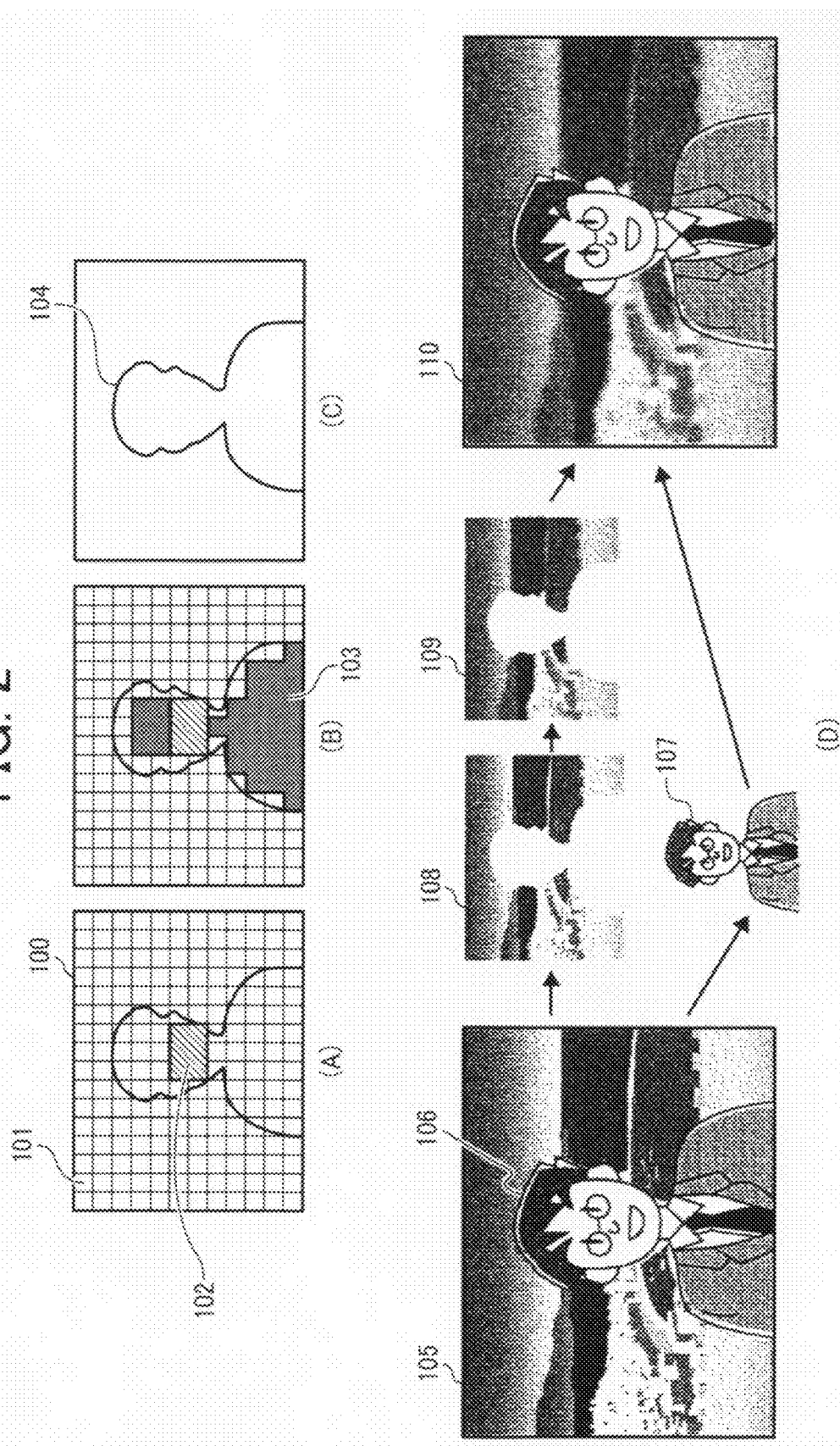
FIG. 2 is an illustrative diagram of an image according to an example 1.

As illustrated in FIG. 2 (A), reference numeral 100 represents a view angle of a monitoring image and reference numeral 101 denotes one of AF evaluation value areas, which is a small area divided evenly within a range of the view angle of the monitoring image. An AF evaluation value of each of the small areas (an integrated value of a contrast of the image within the small area) can be obtained by CCDAF. The system control section 02 analyzes the AF evaluation value corresponding to each lens position of each area obtained by CCDAF scanning on the basis of a prescribed algorithm, and determines a driving position of the lens with respect to a peak AF evaluation value. In addition, with respect to each area, the system control section 02 converts the driving position of the lens departing from a present zoom position into the distance information.

It is known that a technical definition of the AF evaluation value has been illustrated in Japanese Application Publication Number 2000-152065, paragraph 0016. To be more specific, the AF evaluation value is obtained by performing calculation of a HPF in the horizontal direction with respect to each pixel within the area and by summing the obtained results. For instance, k i={−1, −2, 6, −2, −1} can be used for determining a coefficient of the HPF. In detail, "k0" is a coefficient obtained by multiplying with a pixel located at coordinate −2 in the horizontal direction of a pixel of interest; "k1" is a coefficient obtained by multiplying with a pixel located at coordinate −1 in the horizontal direction of a pixel of interest; "k3" is a coefficient obtained by multiplying with a pixel of interest; "k4" is a coefficient obtained by multiplying with a pixel located at coordinate +1 in the horizontal direction of a pixel of interest and "k5" is a coefficient obtained by multiplying with a pixel located at coordinate +2 in the horizontal direction of a pixel of interest.

The distance information can be acquired from the AF evaluation value in accordance with the Gauss imaging equation $1/a+1/b=1/f$, wherefrom a formula of "$a=bf/(b-f)$" can be obtained. Here, "a" is a lens-to-subject distance, namely the distance information to be acquired, "b" is a lens-to-imaging element distance and "f" is a focal length of the lens. The focal length f of the lens can be obtained uniquely from a zoom position at the time of photographing. The lens-to-imaging element distance b can be obtained uniquely from the driving position of the focus lens determined from a peak of the AF evaluation values. The respective distance information of each of the small areas within the entire range of the view angle 100, like the AF evaluation value area 101, is obtainable as mentioned above.

Moreover, as illustrated in FIG. 2 (A), reference numeral 102 denotes an A F area set by AF to perform focusing. The system control section 02 determines an area with the closest proximity as the AF area among the AF evaluation areas in a central part of the image (see step 01-004). In addition, a block with the same distance as the AF area is determined as a main subject block (see step 01-005). As illustrated in FIG. 2 (B), reference numeral 103 represents the main subject block (the main subject block 103 includes the AF area 102).

At this time, the system control section 02 calculates and memorizes an average brightness of image data of a position corresponding to the main subject block 103 (see step 01-006). Moreover, the system control section 02 determines a main subject area based on the obtained information on the main subject block 103 and a photographed image (see step 01-007). Compared with a conventional image processing (contour extraction), this processing determines an area of an arbitrary shape including the main subject block 103.

As is shown in FIG. 2 (C), reference numeral 104 represents the main subject area. Based on information on the main subject area 104, the image processing section 04 sequentially performs extraction processing of the main subject image, blur processing of a background image and composite processing (see step 01-008~010). As shown in FIG. 2 (D), reference numeral 105 represents the photographed image; reference numeral 106 denotes the main subject; reference numeral 107 represents an extracted main subject image; reference numeral 108 denotes the background image; reference numeral 109 represents a blurred background image and reference numeral 110 denotes a composite image.

In the extraction processing of the main subject (step 01-008), the main subject is extracted by separating the image thereof along the contour of the main subject area 104. Consequently, the photographed image 105 is separated as the main subject image 107 and the background image 108. In the blur processing of the background image (step 01-009), the blur processing is performed on the background image 108 based on the blurring amount parameter, whereby the blurred background image 109 is generated. This processing is a smoothing filter processing at a size (5×5 in case of 5) which is specified by the blurring amount parameter.

In the smoothing filter processing, a smoothing filter (k (ix, iy)) is calculated for an input image (In (x, y)), whereby an output image (Out (x, y)) is obtained.

Formula 1 can be expressed as follows.

$$\text{Out}(x, y) = \frac{\left(\sum_{iy=0}^{fs-1} \sum_{ix=0}^{fs-1} k(ix, iy) \text{In}\left(\frac{x + ix - fs}{2}, \frac{y + iy - fs}{2}\right)\right)}{\sum_{iy=0}^{fs-1} \sum_{ix=0}^{fs-1} k(ix, iy)}$$

Here, "In" is the input image; "Out" is the output image; "k" is the smoothing filter and "fs" is a smoothing filter size (>=1). In this embodiment, k (ix, iy)=1; ix:0~fs−1 and iy:0~fs−1. The blurring amount parameter is changeable depending on the user's operation, whereby the blurring amount can be controlled. The size of the smoothing filter aforementioned can be changed by this parameter. In the formula 1, "fs" is equivalent to the blurring parameter and a value of "fs" varies by 1 at a time with the user's operation in step 01-015 illustrated hereinafter.

"x" and "y" of the input image (In (x, y)) denote coordinate values of the pixel of interest (horizontal coordinate is x and vertical coordinate is y). "ix" and "iy" of the smoothing filter (k (ix, iy)) denote a position of a coefficient of the smoothing filter ("ix" represents a horizontal direction and "iy" represents a vertical direction). According to the formula 1, the value of the pixel of interest can be replaced by an average value of surrounding pixels (a square with one side size thereof being "fs"). When "fs" increases, the size of the averaging area grows accordingly. Therefore, a high blurring effect is achieved. However, when fs=1, the value of the pixel of interest remains unchanged because the value of the pixel of interest becomes the average value of the pixel of interest alone. Therefore, no blurring effect is achieved in this case.

In the composite processing (step 01-010), the main subject image 107 is overlapped with the blurred background image 109 to composite both, whereby generating the composite image 110. The generated composite image is displayed to the LCD 06 via the display control section 05 (step 01-011). A processing of the monitoring image of one frame is completed as illustrated above. At this time, the system control section 02 calculates the average brightness of the image data of the position corresponding to the main subject block 103 (see step 01-012) for comparison with the calculated and memorized value in step 01-006. When there exists a difference in excess of a prescribed amount, the system control section 02 shifts to the scanning operation of CCDAF again (see step 01-013).

When an operation to change the blurring amount is performed, the blurring amount parameter is changed corresponding to the operation (see step 01-014, 015), whereby the above operation is performed repeatedly until the monitoring is completed. (see step 01-016). For each frame, the processing of the monitoring image is repeatedly performed from the step 01-007. In this embodiment, although a change in the main subject image is detected via the average brightness, the change in the main subject image can also be detected either via a brightness histogram or via an evaluation value (R integrated value, B integrated value) adopted in an AWB control.

EXAMPLE 2

Figure 4:
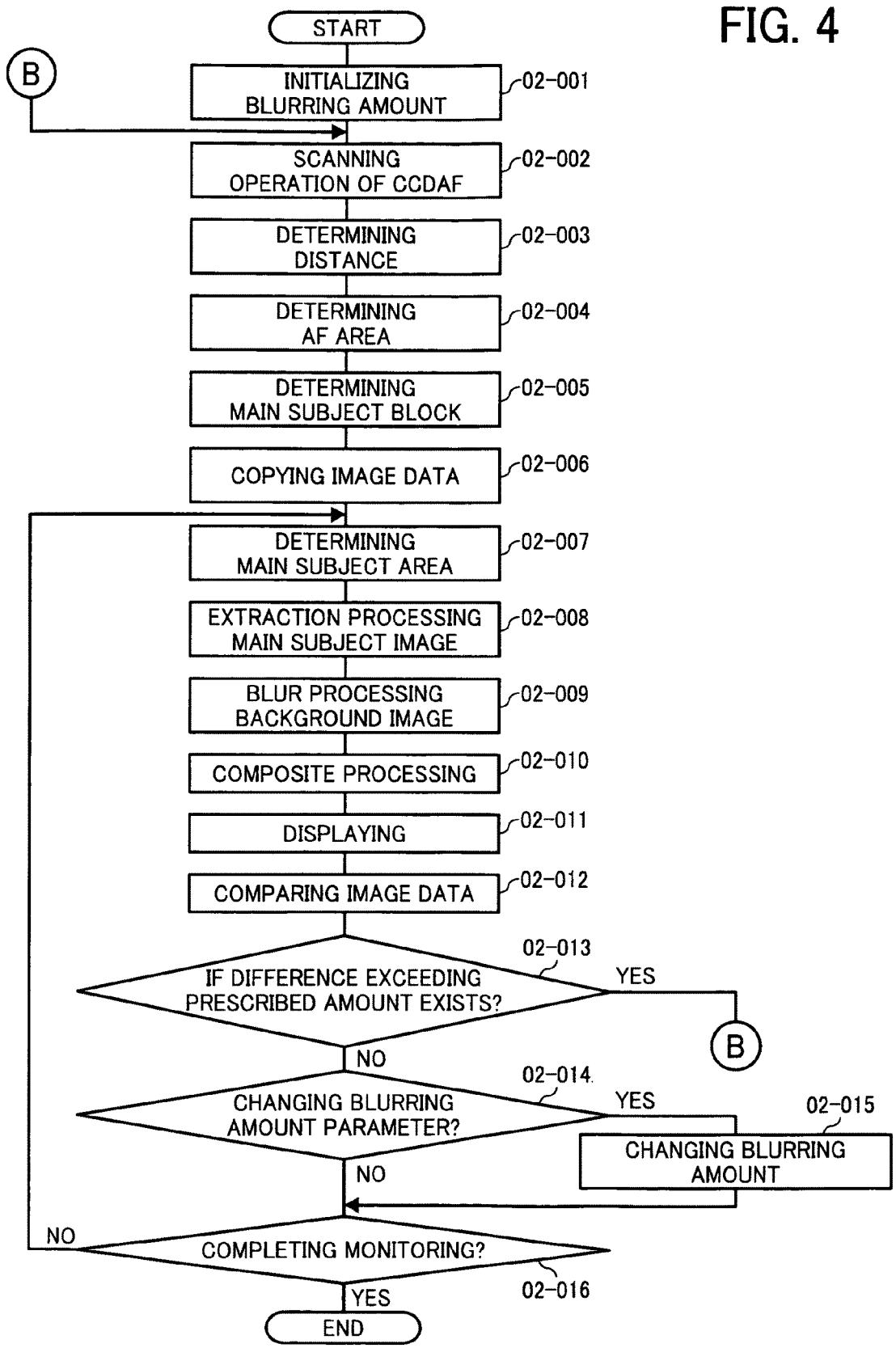
FIG. 4 is an operation flow of an example 2.

Then, another example will be illustrated when the distance information is obtained based on a variation in the pattern. An operational flow is shown in FIG. 4, wherein a processing performed from a step 02-001 to a step 02-005 is the same as that in the step 01. When the determination of the main subject block is completed, the system control section 02 copies the image data of the position corresponding to the main subject block 103 to a work memory within the system control section 02 (see step 02-006). A processing performed from a step 02-007 to a step 02-011 is the same as that in the step 01.

When the composite image is displayed, the system control section 02 compares the image data corresponding to the position of the main subject block 103 with the data copied to the work memory in the step 02-006. When there exists a difference in excess of a prescribed amount, the system control section 02 shifts to the scanning operation of CCDAF again (see step 02-013).

Concerning the step 01-009, as an example, the background image 108 is blurred uniformly according to the blurring amount parameter. However, it is also possible to change the blurring amount by dividing the background image 108 into a plurality of small sections according to a distance of each of the small sections of the background image 108. In this case, in the step 01-009, based on the distance of each position of the image obtained from the step 01-003, the background image 108 can be divided into a plurality of small sections. With respect to those small sections with a great distance, the blur processing is performed with the blurring parameter increased by +1. Meanwhile, an advantage of performing the blur processing when photographing is that an optimum picture can be photographed with the composition image having a blurring effect because the blurring effect can be confirmed via a through image prior to the photographing.

Concerning the blur processing of the step 01-009, based on a distance of each position of the image obtained from the step 01-003, the background image 108 can be further divided into the plurality of small sections. The blur processing is performed after the blurring parameter is determined corresponding to the distance of each of small sections. A blurring amount parameter "fs" can be determined by a following formula.

$fs = Kf|(a'-a)|(a'a)$ (round-up after the decimal point, wherein "a" is a distance up to the background whereto the blur processing is performed; "a'" is a distance up to an in-focus subject, "f" is the focus length and "K" is a coefficient determined by the imaging element or an aperture (for example, 1.2E3).

Embodiment 2

The present embodiment of the present invention will be illustrated hereinafter. FIG. 1 illustrates a schematic structure of a digital still camera and a configuration of connection devices. In FIG. 1, reference numeral 01 denotes the digital still camera; reference numeral 02 represents a system control section composed of a CPU, a NAND flash memory, a SDRAM, a timer, etc., provided to perform control over the entire the digital still camera 01; and reference numeral 03 denotes an image pickup section composed of an optical system component (a lens and a lens drive motor), a CCD, a CCD drive circuit, an A/D converter, etc.

Reference numeral 04 represents an image processing section, which is composed of a DSP (a digital signal processor) to process an image, a RAM and etc., provided to perform compressing and expanding of the image. The image processing section performs CCD driving timing of the image pickup section 03, zooming to control a lens drive motor, focusing and an exposure adjustment, etc., accompanied by performing various image processing to images obtained by the image pickup section 03. Reference numeral 05 denotes a display control section to perform signal processing so as to display the processed image signal processed in the image processing section 04 to a LCD. The display control section 05 is composed of a D/A converter, an on-screen display controller, etc., provided to display various graph images generated for a user interface to the LCD.

Reference numeral 06 denotes the LCD to display the image, provided to display the graph images for the user interface. Reference numeral 07 represents a recording medium interface section which is composed of a memory card controller, etc., provided to interface the recording medium. Reference numeral 08 denotes a recording medium which is composed of a flash memory, provided to store various information associated with the compressed image signal and the image. The recording medium 08 is attachable to and detachable from the digital still camera 01.

Reference numeral 09 denotes a hard key interface section which is composed of a sub CPU or the like. The hard key interface section 09 is provided to detect a state of the user interface such as a key (not shown) and a dial (not shown) and to perform main power control to a main CPU. Reference numeral 10 represents a communication interface section composed of a communication controller, which is provided to perform data communication via connecting to a USB. Reference numeral 11 denotes a PC, which is provided to perform various kinds of settings to the digital still camera 01 and to connect the digital still camera 01 via the USB to transfer and play the image from the digital still camera 01.

First, a conventional start operation will be illustrated as follows. When the user presses a power button (not shown), the hard key interface section 09 starts power supply to the main CPU. The main CPU in the system control section 02 first starts an access (an execution of a program) from a boot section of the NAND flash memory and transmits the program/data to the SDRAM via the boot program. When the transmission to the SDRAM is completed, an execution pointer of the program (a program counter) is moved to the transmitted program on the SDRAM, whereafter a start processing is commenced by the program on the SDRAM.

The start processing includes an initialization of an OS (operating system), an extension of a lens barrel and an initialization of the recording medium or the like. The extension of the lens barrel is performed by giving a pulse signal at a predetermined interval (2 ms) to the lens drive motor of the image pickup section 03 via the image processing section 04. With respect to the initialization processing of the recording medium, an initialization command is issued to the recording medium 08 after supplying power and a clock to the recording medium 08 via the recording medium interface section 07. An actual initialization processing of the recording medium is performed within the recording medium 08. In order to detect completion of the actual initialization process of the recording medium 08, the system control section 02 polls a status of the recording medium 08 at an interval of 10 ms.

Then, operation at the time of photographing will be illustrated as follows. The user determines a photographing mode (a high image quality mode, a low image quality mode, etc.) by operating dials. The operation contents of the user are determined in the system control section 02 via the hard key interface section 09. The system control section 02 generates a guidance graph to the display control section 05 in response to the operation of the user, whereby promoting the following operation of the user. When the photographing mode is determined, the system control section 02 sets processing parameters to the image processing section 04 corresponding to the photographing mode.

Alternatively, the user determines a view angle (a composition) by operating a zoom lever (not shown). The operation contents of the user are determined in the system control section 02 via the hard key interface section 09. The system control section 02 controls the image pickup section 03 and drives the lens thereof in response to the operation of the user. Under the control from the image processing section 04 and prior to a practical photographing, the image pickup section 03 starts an photographing operation so as to display a monitoring image. Concurrently, the image processing section 04 starts processing of face detection.

Photographed data is conveyed to the image processing section 04 continuously and processings such as a conversion of a color space, a gamma compensation, a white balance adjustment, etc. are performed in the image processing section 04, whereafter an image data is conveyed to the display control section 05. Concurrently, the image processing section 04 performs an exposure detection using a result of the face detection, controls and adjusts the image pickup section 03. The display control section 05 performs signal processing to the image data and displays a processed data to the LCD 06 so as to present a photographing state to the user. When a release button (not shown) is pressed, similar to the mode settings, operation contents of the user are determined in the system control section 02 via the hard key interface section 09.

Under the control from the image processing section 04, the image pickup section 03 transmits a taken image to the image processing section 04 after performing a focus adjustment. The image processing section 04 performs image processing and compression processing corresponding to the photographing mode. After the compressed image data is read by the system control section 02 and header information is added in addition, a converted data is written to the recording medium 08 via the recording medium interface section 07. A succession of photographing operations are completed as described above.

EXAMPLE 3

Figure 6:
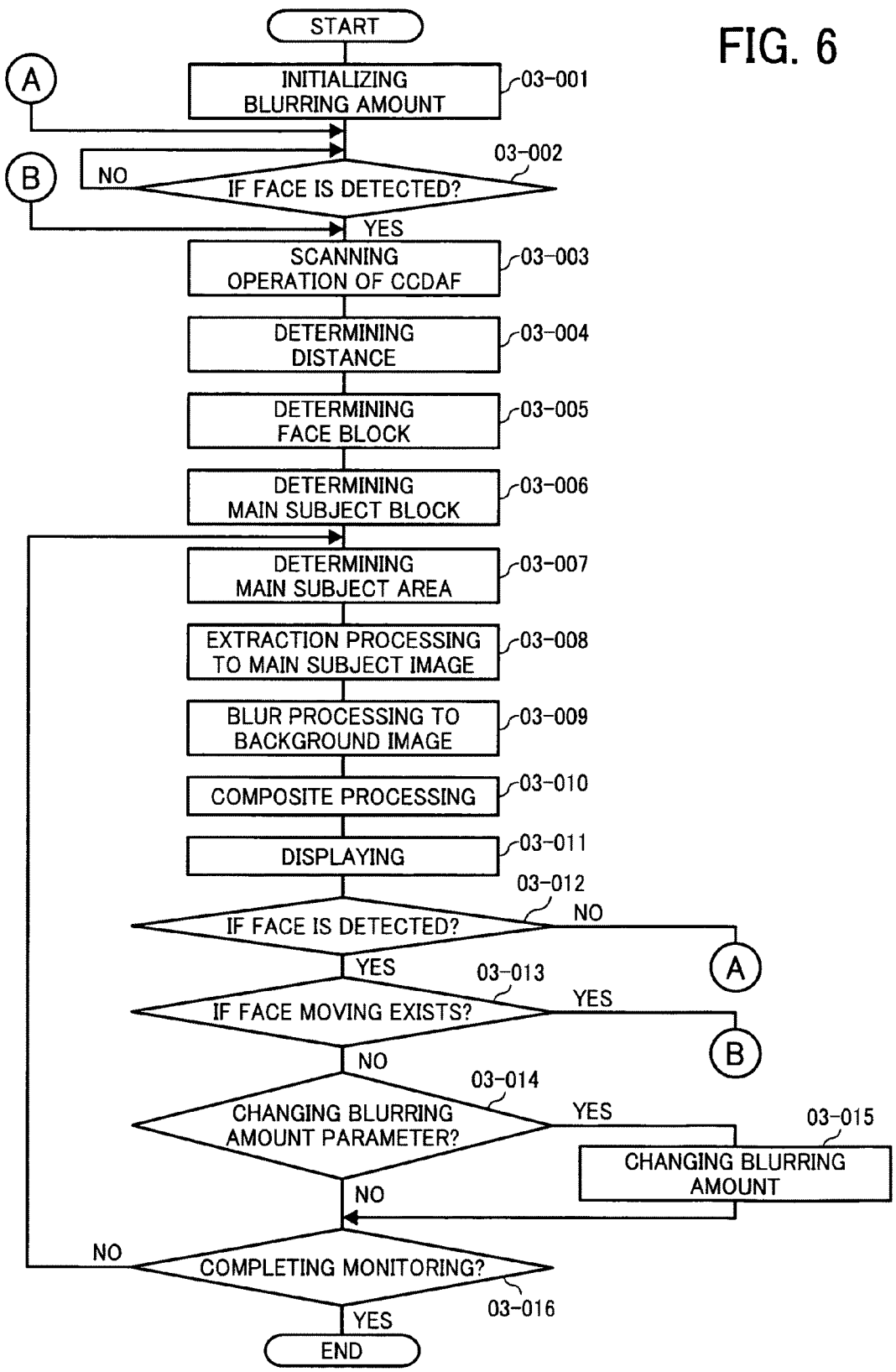
FIG. 6 is an operation flow of the example 3.

Then, a third example of the present invention will be illustrated when distance information is acquired based on the result of the face detection. An operational flow is shown in FIG. 6, wherein operations during the monitoring are illustrated. When the monitor operations begin, the system control section 02 sets a blurring amount parameter described hereinafter to an initial value (=5) (step 03-001). If the face is detected by the image processing section 04, (step 03-002), the system control section 02 controls the image processing section 04 and the image pickup section 03, and performs a scanning operation of CCDAF (step 03-003). Then the system control section 02 performs distance determination to each position of each image (step 03-004).

Figure 5:
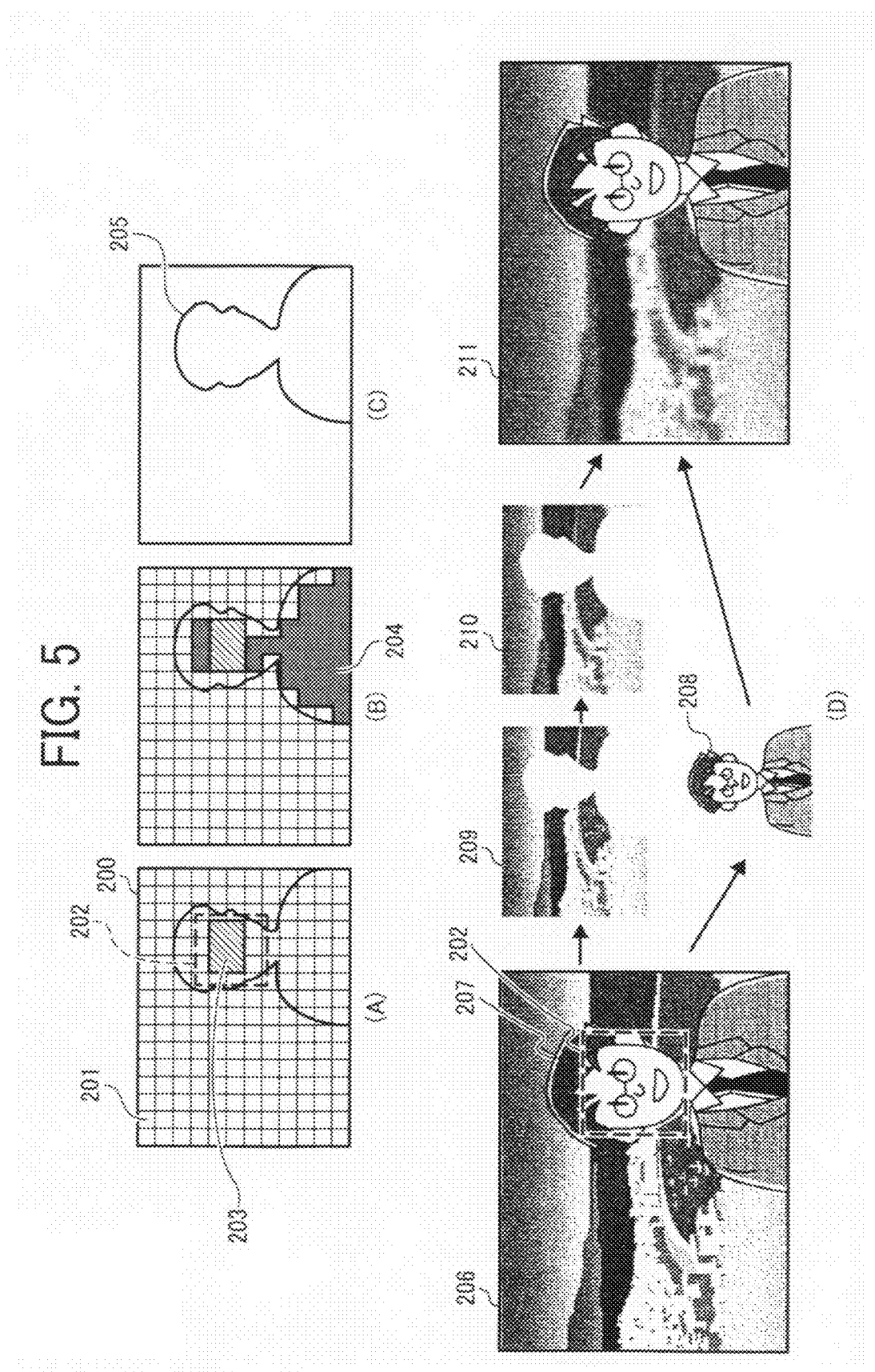
FIG. 5 is an illustrative diagram of an image according to an example 3.

As illustrated in FIG. 5 (A), reference numeral 200 represents a view angle of a monitoring image and reference numeral 201 denotes one of AF evaluation value areas, which is a small area divided evenly within a range of the view angle of the monitoring image. An AF evaluation value of each of the small areas (an integrated value of a contrast of the image within the small area) can be obtained by CCDAF. The system control section 02 analyzes the AF evaluation value corresponding to each lens position of each area obtained by CCDAF scanning on the basis of a prescribed algorithm, and determines a driving position of the lens with respect to a peak AF evaluation value. In addition, with respect to each area, the system control section 02 converts the driving position of the lens departing from a present zoom position into the distance information.

It is known that a technical definition of the AF evaluation value has been illustrated in Japanese Application Publication Number 2000-152065, paragraph 0016 in particular. To be more specific, the AF evaluation value is obtained by performing a calculation of a HPF in the horizontal direction with respect to each pixel within the area and by summing an obtained result. For instance, k i={−1, −2, 6, −2, −1} can be used for determining a coefficient of the HPF. In detail, "k0" is a coefficient obtained by multiplying with a pixel located at coordinate −2 in the horizontal direction of a pixel of interest; "k1" is a coefficient obtained by multiplying with a pixel located at coordinate −1 in the horizontal direction of a pixel of interest; "k3" is a coefficient obtained by multiplying with a pixel of interest; "k4" is a coefficient obtained by multiplying with a pixel located at coordinate +1 in the horizontal direction of a pixel of interest and "k5" is a coefficient obtained by multiplying with a pixel located at coordinate +2 in the horizontal direction of a pixel of interest.

The distance information can be acquired from the AF evaluation value in accordance with the Gauss imaging equation $1/a+1/b=1/f$, wherefrom a formula of "$a=bf/(b-f)$" can be obtained. Here, "a" is a lens-to-subject distance, namely the distance information to be acquired, "b" is a lens-to-imaging element distance and "f" is a focal length of the lens. The focal length f of the lens can be obtained uniquely from a zoom position at the time of photographing. The lens-to-imaging element distance b can be obtained uniquely from the driving position of the focus lens determined from a peak of the AF evaluation values. The respective distance information of each of the small areas within the entire range of the view angle 200, like the AF evaluation value area 201, is obtainable as mentioned above.

Moreover, as illustrated in FIG. 5 (A), reference numeral 202 denotes a face detection area and reference numeral 203 represents a face detection block, which is an AF evaluation area included in the face detection area. The system control section 02 determines the AF evaluation area included in the face detection area as the face detection block 203 (see step 03-005). In addition, a block with the same distance as the face detection block 203 is determined as a main subject block (see step 03-006). As illustrated in FIG. 5 (B), reference numeral 204 represents the main subject block (the main subject block 204 includes the face detection block 203).

The system control section 02 determines a main subject area based on obtained information on the main subject block 204 and a photographed image (see step 03-007). Compared with a conventional image processing (contour extraction), this processing determines an area of an arbitrary shape including the main subject block 204. As is shown in FIG. 5(C), reference numeral 205 represents the main subject area. Based on information on the main subject area 205, the image processing section 04 sequentially performs extraction processing of a main subject image, blur processing of background image and composite processing (see step 03-008~010).

As is illustrated in FIG. 5 (D), reference numeral 206 represents the photographed image; reference numeral 207 represents the main subject; reference numeral 208 represents the extracted image of the main subject; reference numeral 209 represents the background image; reference numeral 210 is the blurred background image and reference numeral 211 represents a composite image. In the extraction processing of the main subject (step 03-008), the main subject is extracted by separating the image thereof along a contour of the main subject area 205. Consequently, the photographed image 206 is separated as the main subject image 208 and the background image 209. In the blur processing of the background image (step 03-009), the blur processing is performed to the background image 209, based on the blurring amount parameter, whereby the blurred background image 210 is generated. This processing is a smoothing filter processing at a size (5×5 in case of 5) which is specified by the blurring amount parameter.

In the smoothing filter processing, a smoothing filter (k (ix, iy)) is calculated for an input image (In (x,y)), whereby an output image Out (x,y)) is obtained.

Formula 2 is as follows.

$$Out(x, y) = \frac{\left(\sum_{iy=0}^{fs-1} \sum_{ix=0}^{fs-1} k(ix, iy) In\left(\frac{x + ix - fs}{2}, \frac{y + iy - fs}{2}\right)\right)}{\sum_{iy=0}^{fs-1} \sum_{ix=0}^{fs-1} k(ix, iy)}$$

Here, "In" is the input image; "Out" is the output image; "k" is the smoothing filter and "fs" is a smoothing filter size (>=1). In this embodiment, k (ix, iy)=1; ix: 0~fs-1 and iy: 0~fs-1. The blurring amount parameter is changeable depending on the user's operation, whereby the blurring amount can be controlled. The size of the smoothing filter aforementioned can be changed by this parameter. In the formula 2, "fs" is equivalent to the blurring parameter and a value of "fs" varies by 1 at a time with the user's operation in step 03-015 illustrated hereinafter.

"x" and "y" of the input image (In (x, y)) denote coordinate values of the pixel of interest (horizontal coordinate is x and vertical coordinate is y). "ix" and "iy" of the smoothing filter (k (ix, iy)) denote a position of a coefficient of the smoothing filter ("ix" represents a horizontal direction and "iy" represents a vertical direction). According to the formula 2, the value of the pixel of interest can be replaced by an average value of surrounding pixels (a square with one side size thereof being "fs"). When "fs" increases, the size of the averaging area grows accordingly. Therefore, a high blurring effect is achieved. However, when fs=1, the value of the pixel of interest remains unchanged because the value of the pixel of interest becomes the average value of the pixel of interest alone. Therefore, no blurring effect is achieved in this case.

In the composite processing (step 03-010), the main subject image 208 is overlapped with the blurred background image 210 to composite both, whereby generating a composite image 211. The generated composite image is displayed to LCD 06 via the display control section 05 (step 03-011). The processing of the monitoring image of one frame is completed as illustrated above. At this time, if the face is not detected, the system control section 02 shifts to face redetection standby processing (see step 03-012). Alternatively, when a detected position of the face is detected to depart from the detected position thereof in the step 03-002 beyond a predetermined range, the system control section 02 shifts to the scanning operation of CCDAF again (see step 03-013). In addition, the face detection is processed concurrently in the image processing section 04.

When an operation to change the blurring amount is performed, the blurring amount parameter is changed according to the operation (see step 03-014, 015), whereby the above operation is performed repeatedly until the monitoring is completed. (see step 03-016). For each frame, the processing of the monitoring image is repeatedly performed from the step 03-007.

EXAMPLE 4

Figure 7:
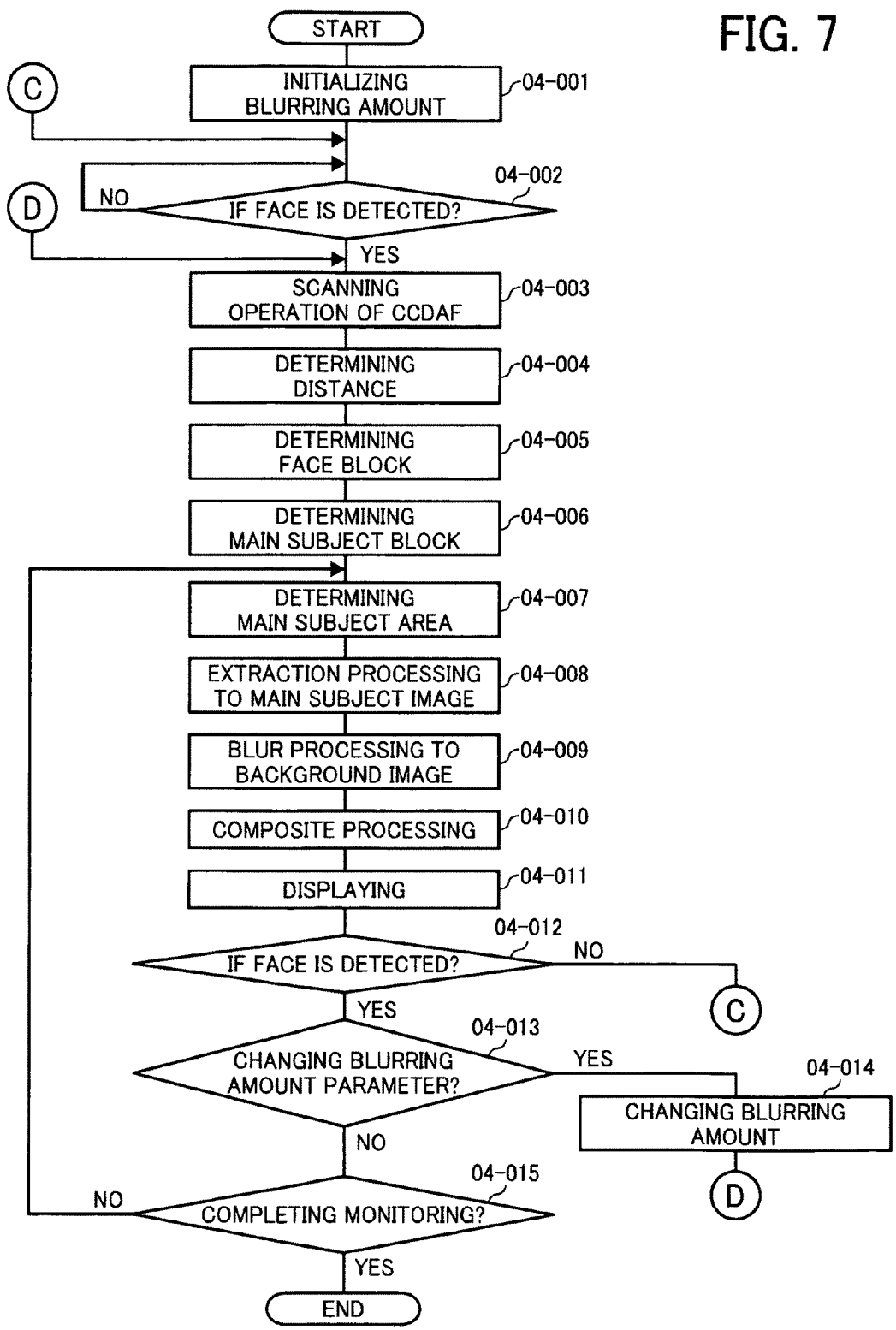
FIG. 7 is an operation flow of an example 4.

Then, an example is illustrated when the distance information is acquired based on the operation of the user. An operational flow is shown in FIG. 7, wherein processing performed from a step 04-001 to a step 04-012 is the same as that in the step 03. When the operation to change the blurring amount is performed, the blurring amount parameter is changed according to the operation (see step 04-013, 014). Concurrently, the system control section 02 shifts to the scanning operation of CCDAF again.

Concerning the step 03-009, as an example, the background image 209 is blurred uniformly according to the blurring amount parameter. However, it is also possible to change the blurring amount by dividing the background image 209 into a plurality of small sections according to a distance of each of the small sections of the background image 209. In this case, in the step 03-009, based on the distance of each position of the image obtained from the step 03-004, the background image 209 can be divided into a plurality of small sections. With respect to those small sections with a great distance, the blur processing is performed with the blurring parameter increased by +1. Meanwhile, an advantage of performing the blur processing when photographing is that an optimum picture can be photographed with the composition image having a blurring effect because the blurring effect can be confirmed via a through image prior to the photographing.

Concerning the blur processing of the step 03-009, based on a distance of each position of the image obtained from the step 03-004, the background image 209 can be further divided into the plurality of small sections. The blur processing is performed after the blurring parameter is determined corresponding to the distance of each small sections. A blurring amount parameter "fs" can be determined by a following formula.

fs=Kf|(a'-a)|(a'a)(round-up after the decimal point, wherein "a" is a distance up to the background whereto the blur processing is performed; "a" is a distance up to an in-focus subject, "f" is the focus length and "K" is a coefficient determined by the imaging element or an aperture (for example, 1.2E3).

According to one embodiment of the present invention, some effects can be obtained as follows.
(1) Since the distance is determined via employing CCDAF instead of using the special hardware, on the one hand, image processing is performable based on the distance; on the other hand, the blur processing is performable.
(2) Meanwhile, since re-ranging is performed based on variances in the image, both the image processing based on the distance and the blur processing are performable without impairing the convenience of a user.
Since the re-ranging is performed in response to a user's operation, effects can be obtained as mentioned in (1).
(4) Since the re-ranging is performed in response to the user's operation to change a blurring amount, the same effects can be obtained as mentioned in (1).
(5) Since determination of an image area where a main subject is located is based on face detection, the main subject can be securely determined by many photographing scenes, whereby the image processing can be performed properly.

(6) Since the re-ranging is performed based on variances in results of the face detection, the same effects can be obtained as mentioned in (3) and (5) without impairing the convenience of the user.

(7) Since distance information is used to determine the image area where the main subject is located, the image area can be determined with higher accuracy and high-quality image processing is thus performable.

Although the present invention has been described in terms of exemplary embodiments, it is not limited thereto. It should be appreciated that various changes and modifications can be made to the embodiments by persons skilled in the art without departing from the scope of the present invention as defined by the following claims.

What is claimed is:

1. An image pickup device, comprising:
    an image pickup element to photograph a subject;
    an imaging lens to form a subject image on the image pickup element;
    a moving section to move a lens so as to perform focus adjustment; and
    a section which determines a focusing degree of each predetermined area within an image,
    wherein the image pickup device is provided with a lens position determining section, which obtains each focusing degree of respective lens moving positions to determine a lens position with a maximum focusing degree;
    a distance determining section which determines a distance from the lens position to a subject corresponding to each predetermined area within the image;
    an image area determining section which determines a specific image area of an in-focus subject;
    a blur processing section which performs blur processing to a background which is an image beyond the specific image area of the subject based on the distance; and
    a display section displaying images obtained successively, wherein
    the distance determining section obtains distance information for the respective predetermined areas based on variances in the obtained images, and
    the blur processing section determines a blur parameter fs corresponding to the obtained distance information for each predetermined area according to the following equation and performs the blur processing:

$$fs = Kf|(a'-a)|/(a'a)$$

where "a'" is a distance from the lens position up to the background whereto the blur processing is performed, "a" is a distance from the lens position up to the in-focus subject, "f" is a focus length of the imaging lens, and "K" is a coefficient.

2. The image pickup device according to claim 1, wherein the image area determining section determines a subject image area whereto focusing is performed.

3. The image pickup device according to claim 1, wherein the image area determining section determines an image area where a main subject is located.

4. The image pickup device according to claim 3, wherein the determination of the image area where the main subject is located is based on face detection.

5. The image pickup device according to claim 4, wherein the image pickup device comprises
    a section which obtains the distance information based on variances in a face detection result and performs the blur processing via the blur processing section to the respective images obtained successively.

6. The image pickup device according to claim 3, wherein distance information is used to determine the image area where the main subject is located.

7. The image pickup device according to claim 1, wherein the variances in the images are based on variances in lightness information of the images where the subjects are located.

8. The image pickup device according to claim 1, wherein the variances in the images are based on variances in color information of the images where the subjects are located.

9. The image pickup device according to claim 1, wherein the variances in the images are based on variances in an image pattern of the images where the subjects are located.

10. The image pickup device according to claim 1, wherein the image pickup device comprises
    a section which obtains the distance information in accordance with a predetermined operation and performs the blur processing via the blur processing section to the respective images obtained successively.

11. The image pickup device according to claim 10, wherein the predetermined operation is an operation to change a blurring amount.

12. A method of controlling an image pickup device which includes photographing a subject by an image pickup element; forming a subject image on the image pickup element by an imaging lens; performing focus adjustment by moving a lens; and determining a focusing degree of each predetermined area within an image, the method comprising:
    obtaining each focusing degree of the respective lens moving positions to determine a lens position with a maximum focusing degree;
    determining a distance from the lens position to a subject corresponding to each predetermined area within the image;
    determining a specific image area of an in-focus subject;
    performing blur processing to a background which is an image beyond the specific image area of the subject based on the distance; and
    displaying images obtained successively, whereby the distances information is obtained for the respective predetermined areas based on variances in the obtained images and a blur parameter fs corresponding to the obtained distance information for each predetermined area according to the following equation and is used in the blur processing:

$$fs = Kf|(a'-a)|/(a'a)$$

where "a'" is a distance from the lens position up to the background whereto the blur processing is performed, "a" is a distance from the lens position up to the in-focus subject, "f" is a focus length of the imaging lens, and "K" is a coefficient.

13. The method of controlling the image pickup device according to claim 12, wherein determining the image area is determining an image area of the subject whereto focusing is performed.

14. The method of controlling the image pickup device according to claim 12, wherein determining the image area is determining an image area where the main subject is located.

15. The method of controlling the image pickup device according to claim 14, wherein determining the image area where the main subject is located is based on the face detection.

16. The method of controlling the image pickup device according to claim 14, wherein distance information is used to determine the image area where the main subject is located.

* * * * *